United States Patent

Kim

(10) Patent No.: US 8,958,463 B2
(45) Date of Patent: Feb. 17, 2015

(54) WIRELESS COMMUNICATION APPARATUS AND WIRELESS COMMUNICATION METHOD THEREOF

(71) Applicant: LG Innotek Co., Ltd., Seoul (KR)

(72) Inventor: Jong Woon Kim, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 30 days.

(21) Appl. No.: 13/739,720

(22) Filed: Jan. 11, 2013

(65) Prior Publication Data

US 2014/0072019 A1    Mar. 13, 2014

(30) Foreign Application Priority Data

Sep. 12, 2012 (KR) .................. 10-2012-0101208

(51) Int. Cl.
*H04B 1/38* (2006.01)
*H04B 1/44* (2006.01)
*H04B 1/40* (2006.01)

(52) U.S. Cl.
CPC ... *H04B 1/44* (2013.01); *H04B 1/40* (2013.01)
USPC ............... 375/219; 375/297; 455/522

(58) Field of Classification Search
None
See application file for complete search history.

(56) References Cited

U.S. PATENT DOCUMENTS

| | | | |
|---|---|---|---|
| 4,495,648 A | 1/1985 | Giger | |
| 5,452,473 A | 9/1995 | Weiland et al. | |
| 5,471,654 A | 11/1995 | Okazaki et al. | |
| 6,236,863 B1 * | 5/2001 | Waldroup et al. ............. | 455/522 |

FOREIGN PATENT DOCUMENTS

| | | |
|---|---|---|
| JP | 53-113018 | 9/1978 |
| JP | 57-181235 A | 11/1982 |
| JP | 59-133739 A | 8/1984 |
| JP | 60-181941 U | 12/1985 |
| JP | 60-261228 A | 12/1985 |
| JP | 61-109246 U | 7/1986 |
| JP | 01-105624 A | 4/1989 |
| JP | 01-129535 A | 5/1989 |
| JP | 02-309721 A | 12/1990 |
| JP | 06-334561 A | 12/1994 |
| JP | 07-074668 A | 3/1995 |
| JP | 08-088579 A | 4/1996 |
| JP | 08-510614 A | 11/1996 |

* cited by examiner

*Primary Examiner* — Adolf Dsouza
(74) *Attorney, Agent, or Firm* — Birch, Stewart, Kolasch & Birch, LLP

(57) ABSTRACT

The present invention provides a wireless communication apparatus and a wireless communication method. The wireless communication apparatus includes an antenna for receiving or transmitting a signal; a receiving unit for demodulating the reception signal received through the antenna; a transmitting unit for generating the transmission signal to be transmitted through the antenna; and a control unit for determining a strength of the reception signal received through the antenna in order to set a strength of the transmission signal based on the strength of the reception signal.

10 Claims, 3 Drawing Sheets

WIRELESS COMMUNICATION APPARATUS AND WIRELESS COMMUNICATION METHOD THEREOF

CROSS-REFERENCE TO RELATED APPLICATIONS

The present application claims priority under 35 U.S.C. 119 and 35 U.S.C. 365 to Korean Patent Application No. 10-2012-0101208 (filed on 12 Sep. 2012), which is hereby incorporated by reference in its entirety.

BACKGROUND

The embodiment relates to a wireless communication apparatus, and more particularly, to a wireless communication apparatus which can set wireless communication environment based on a correlation according a transceiving state of a wireless signal and a wireless communication method thereof.

Generally, in a wireless communication system of a time-division duplex (TDD) scheme where the same frequency is subject to time-division for signal transmission and signal reception, a transmit/receive antenna switch (hereinafter, referred to as 'TRAS'), which performs a switching function between a high-power RF transmit signal and a low-power RF receive signal, shuts off the transmission power introduced to a low noise amplifier (LNA) of a receiver end in a transmission mode to protect the LNA and reduces the noise introduced from a transmitter end in a reception mode to prevent the receiving sensitivity from being deteriorated.

FIG. 1 is a block diagram showing a wireless communication apparatus according to the related art.

Referring to FIG. 1, the wireless communication apparatus includes switch 10, a low noise amplifier (LNA) 20, a wireless signal receiving unit 30, a wireless signal transmitting unit 40, a power amplifier (PA) 50, and a control unit 60.

Hereinafter, the operation of the wireless communication apparatus configured as described above according to the related art will be described in detail.

First, a reception signal received through an antenna is input into a wireless communication module through the switch 10. The wireless communication module may include the LNA 20, the wireless signal receiving unit 30, the wireless signal transmitting unit 40, the PA 50, and the control unit 60.

At this time, after the reception signal is input to the LNA 20, the reception signal is demodulated through the wireless signal receiving unit 30.

Further, an auto gain control (AGC) voltage is generated from the wireless signal receiving unit 30 according to a level of the reception signal. The generated AGC voltage is feed-backed to a differential amplifier of a wireless signal receiver end, so that an intermediate frequency (IF) signal having a predetermined level is generated regardless of the level of the reception signal input to the LNA 20.

In addition, the wireless signal transmitting unit 40 generates a transmission signal. The transmission signal is amplified to a predetermined transmission power by the PA 50 and then, transferred to the antenna through the switch 10.

The transmission power of the transmission signal is fixed to a predetermined value. In addition, the transmission power may be changed by a user.

Meanwhile, when the level of the reception signal is high, it signifies that the current communication environment with another apparatus is good. In this case, even if the transmission power is set not too high, problems may not occur in transmission of the transmission signal.

However, according to the wireless communication apparatus of the related art, the transmission power is fixed regardless of the level of the reception signal, so that the power consumption of the power amplifier is increased.

In addition, due to harmonic components generated when the transmission power of the transmission signal is high, radio interference may occur between electronic apparatus and bad influence is exerted on the EMI standard.

SUMMARY

The embodiment provides a wireless communication apparatus which can identify a receiving level of a wireless signal to set a transmitting level interactively with the receiving level and a wireless communication method thereof.

Further, the embodiment provides a wireless communication apparatus which can reduce power consumption and minimize radio interference on other apparatuses by varying a transmission level of a wireless signal according to wireless communication environment and a wireless communication method thereof.

The technical tasks which will be achieved in the proposed embodiments are not limited to above, and other technical tasks, which are not mentioned, will be apparently understood to those skilled in the art.

According to an embodiment, there is provided a wireless communication apparatus. The wireless communication apparatus includes an antenna for receiving or transmitting a signal; a receiving unit for demodulating the reception signal received through the antenna; a transmitting unit for generating the transmission signal to be transmitted through the antenna; and a control unit for determining a strength of the reception signal received through the antenna in order to set a strength of the transmission signal based on the strength of the reception signal.

The control unit determines the strength of the reception signal by using an AGC voltage output through the receiving unit.

The wireless communication apparatus further includes an analog-to-digital converting unit for receiving the AGC voltage output through the receiving unit, converting the received AGC voltage into a digital signal, and transferring the digital signal to the control unit.

The control unit sets the strength of the transmitting unit inversely proportional to the strength of the receiving signal.

The transmitting unit further includes a power amplifier for amplifying the transmission signal based on the transmitting strength set through the control unit.

The wireless communication apparatus further includes a digital-to-analog converting unit disposed between the power amplifier and the control unit for converting information about the strength of the transmission signal output through the control unit into an analog signal and transferring the analog signal to the power amplifier.

The wireless communication apparatus further includes a switch for outputting the reception signal received through the antenna to the receiving unit or for outputting the transmission signal generated through the transmitting unit according to a control signal of the control unit.

According to an embodiment, there is provided a wireless communication method of a wireless communication apparatus. The wireless communication method includes: receiving a reception signal transmitted from an outside through an antenna; determining a strength of the reception signal; setting a strength of a transmission signal transmitted to an outside based on the determined strength of the reception signal; and transmitting a transmission signal corresponding to a set strength of the transmission signal through the antenna.

The determining of the strength of the reception signal includes identifying an AGC voltage of the reception signal.

The setting of the strength of the transmission signal includes setting the strength of the transmission signal inversely proportional to the strength of the reception signal.

The wireless communication method further includes amplifying the transmission signal based on the set strength.

As described above, according to the embodiment, the strength of the transmission signal is identified and varied interactively with the strength of the reception signal in communication environment among apparatuses equipped with wireless communication modules, so that the power consumption due to the amplification of the transmission signal can be reduced and radio interference on other apparatuses can be effectively reduced.

DETAILED DESCRIPTION OF THE EMBODIMENTS

Hereinafter, a preferable embodiment will be described in detail with reference to the accompanying drawings.

A wireless communication apparatus according to the embodiment may be a terminal. The terminal may include a mobile phone, a smart phone, a laptop computer, a digital broadcasting receiver, PDA (Personal Digital Assistants), PMP (Portable Multimedia Player), and a navigation device.

However, it may be easily understood by those skilled in the art that the configuration disclosed through the embodiment is applicable to a terminal such as a digital TV or a desktop computer.

Preferably, the wireless communication apparatus may include a mobile communication device, a mobile phone, a personal digital assistant (PDA) having a wireless communication function, a portable computer having a wireless communication function, a game console having a wireless communication function, an audio storing and playback apparatus having a wireless communication function, and an Internet apparatus for supporting wireless Internet access. In addition, the wireless communication apparatus may include a wireless communication apparatus using a frequency division duplex (FDD) scheme.

Figure 1:
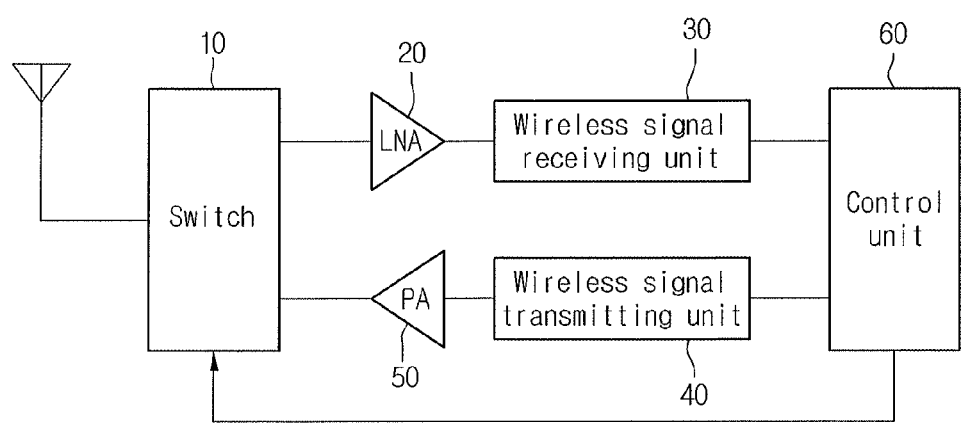
FIG. 1 is a block diagram showing a wireless communication apparatus according to the related art
Figure 2:
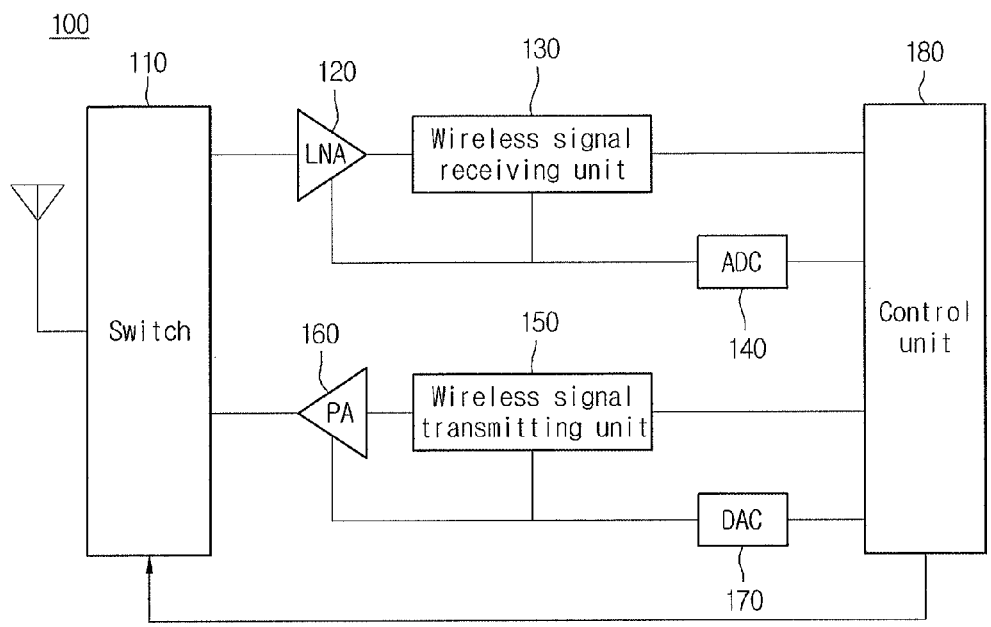
FIG. 2 is a block diagram showing a wireless communication apparatus according to the embodiment.

FIG. 2 is a block diagram showing a wireless communication apparatus according to the embodiment Referring to FIG. 2, the wireless communication apparatus 100 includes a switch 110, a low noise amplifier (LNA) 120, an RF signal receiving unit 130, an analog-to-digital converting (ADC) unit 140, an RF signal transmitting unit 150, a power amplifier (PA) 160, a digital-to-analog converting (DAC) unit 170, and a control unit 180.

The switch 110 includes one terminal which is connected to an antenna and the other terminal which is connected to the LNA 120 or the PA 160.

The switch 110 outputs a signal received through the antenna under an RF signal reception environment to the LNA 120.

Further, the switch 110 is connected to the PA 160 under an RF signal transmission environment and outputs a transmission signal amplified by the PA 160 to the antenna.

The switch 110 may be a circulator, but the embodiment is not limited thereto.

Thus, the switch 110 allows the antenna to be electrically combined with the LNA 120 and the PA 160.

The switch 110 may be a 3-port or 4-port passive non-reciprocal device which outputs a signal input to the first port to the second port and outputs a signal input to the second port to the third port.

That is, the first port of the switch 110 is connected to the PA 160, the second port is connected to the antenna, and the third port is connected to LNA 120, so that a transmission signal inputted from the PA 160 is output to the antenna electrically combined with the second port, and a reception signal input from the antenna to the second port is output to LNA 120 electrically connected to the second port.

The LNA 120 receives the reception signal output through the switch 110, and thus, amplifies the reception signal while suppressing noise components included in the reception signal.

The RF signal receiving unit 130 demodulates the reception signal output from the LNA 120.

In this case, the LNA 120 may be one of elements which constitute the RF signal receiving unit 130. That is, the LNA 120 may be included in the RF signal receiving unit 130.

The RF signal receiving unit 130 frequency-down-converts the signal received through the antenna to output a baseband signal.

To this end, the RF signal receiving unit 130 may include the LNA 120, a low pass filter, a mixer, and a phase locked loop circuit, and when using an intermediate frequency (IF), may further include an IF band pass filter, an IF mixer, and an IF phase locked loop circuit.

Further, the RF signal receiving unit 130 may further include a modem and an analog-to-digital converter for decoding and demodulation.

The band pass filter filters a mixed signal generated during an amplifying procedure of the LNA 120 to pass a signal in a desired frequency band therethrough.

The mixer mixes the signal input from the band pass filter with a carrier frequency signal provided from the phase locked loop circuit to perform a frequency down-conversion, so that an IF signal or a base band signal is output.

When the IF signal is output, the IF mixer frequency-down-converts the IF signal to a base band signal and outputs the base band signal.

The ADC unit 140 receives an AGC voltage provided from the RF signal receiving unit 130 and thus, converts the AGC voltage into a digital signal.

The RF signal transmitting unit 150 frequency-up-converts a base band signal to an RF signal and transfers the RF signal to the antenna. The PA 160 may be included in the RF signal transmitting unit 150.

In this case, the RF signal transmitting unit 150 may include a modem and a digital-to-analog converter for coding and modulation, and a power amplifier, a band pass filter, a mixer, and a phase locked loop circuit for frequency up-conversion. When an intermediate frequency (IF) is used, the RF signal transmitting unit 150 may further include an IF band pass filter, an IF mixer, and an IF phase locked loop circuit. A base band signal is frequency-up-converted to an IF signal by the IF mixer and the IF signal passes through the IF band pass filter.

The mixer mixes the IF signal input from the IF band pass filter with a carrier frequency signal provided from the phase locked loop circuit to perform the frequency-up-conversion, so that a transmission signal is output. The transmission signal passes through the band pass filter to remove noise.

The PA 160 sufficiently amplifies the transmission signal and transmits the amplified signal to the antenna.

The DAC 170 receives information about a transmission power generated from the control unit 180 which will be described below, generates an analog signal based on the information, and transfers the analog signal to the PA 160.

The control unit 180 controls the overall operation of the wireless communication apparatus 100.

Specifically, the control unit 180 sets the transmission power (which has the same signification as of transmission level, output intensity, and amplifying strength) about the transmission signal under a wireless transmission environment.

That is, the control unit 180 identifies a level of the reception signal received through the RF signal receiving unit 130.

To this end, the control unit 180 receives the AGC voltage converted into a digital signal through the ADC unit 140 and determines electronic field strength under the receiving environment based on the AGC voltage.

Then, the control unit 180 sets the transmitting power that is, the transmitting strength of the transmission signal transmitted through the RF signal transmitting unit 150 according to the determined electronic field strength that is, the strength of the reception signal.

The set transmitting power or transmitting strength is an amplifying level at which the PA 160 amplifies the transmission signal.

That is, the control unit 180 sets the strength of the transmission signal interactively with the strength of the reception signal.

For example, when the strength of the reception signal is strong (that is, has a high level), the control unit 180 decreases the strength of the transmission signal according to the strength.

Further, when the strength of the reception signal is strong (that is, has a high level), the control unit 180 increases the strength of the transmission signal.

In other words, when the reception signal has a weak strength due to the bad communication environment, the control unit 180 increases the strength of the transmission signal such that other apparatuses can normally receive the transmission signal.

Further, when the reception signal has a high strength as the current communication environment is good, the control unit 180 decreases the strength of the transmission signal since the transmission signal can be normally received in any other apparatuses even if the strength of the transmission signal is weak.

Meanwhile, the control unit 180 may determine the strength of the reception signal based on a level of the AGC voltage.

As one example of the AGC system used in the embodiment, a reverse AGC system will be described below, in which an AGC voltage of a normal electric field for wireless communication is 5 and the strength of the reception signal is increased as the AGC value is lowered.

When the strength of the transmission signal is divided into 1 to 6 and the input AGC voltage is greater than 5, it signifies that the strength of the reception signal is weak, so the control unit 180 sets the strength of the transmission signal to 6.

When the AGC voltage is less than 1, it signifies that the strength of the reception signal is strong, so the control unit 180 sets the strength of the transmission signal to 1.

As described above, according to the embodiment, the strength of the transmission signal is identified and varied interactively with the strength of the reception signal in communication environment among apparatuses equipped with wireless communication modules, so that the power consumption due to the amplification of the transmission signal can be reduced and radio interference on other apparatuses can be effectively reduced.

Figure 3:
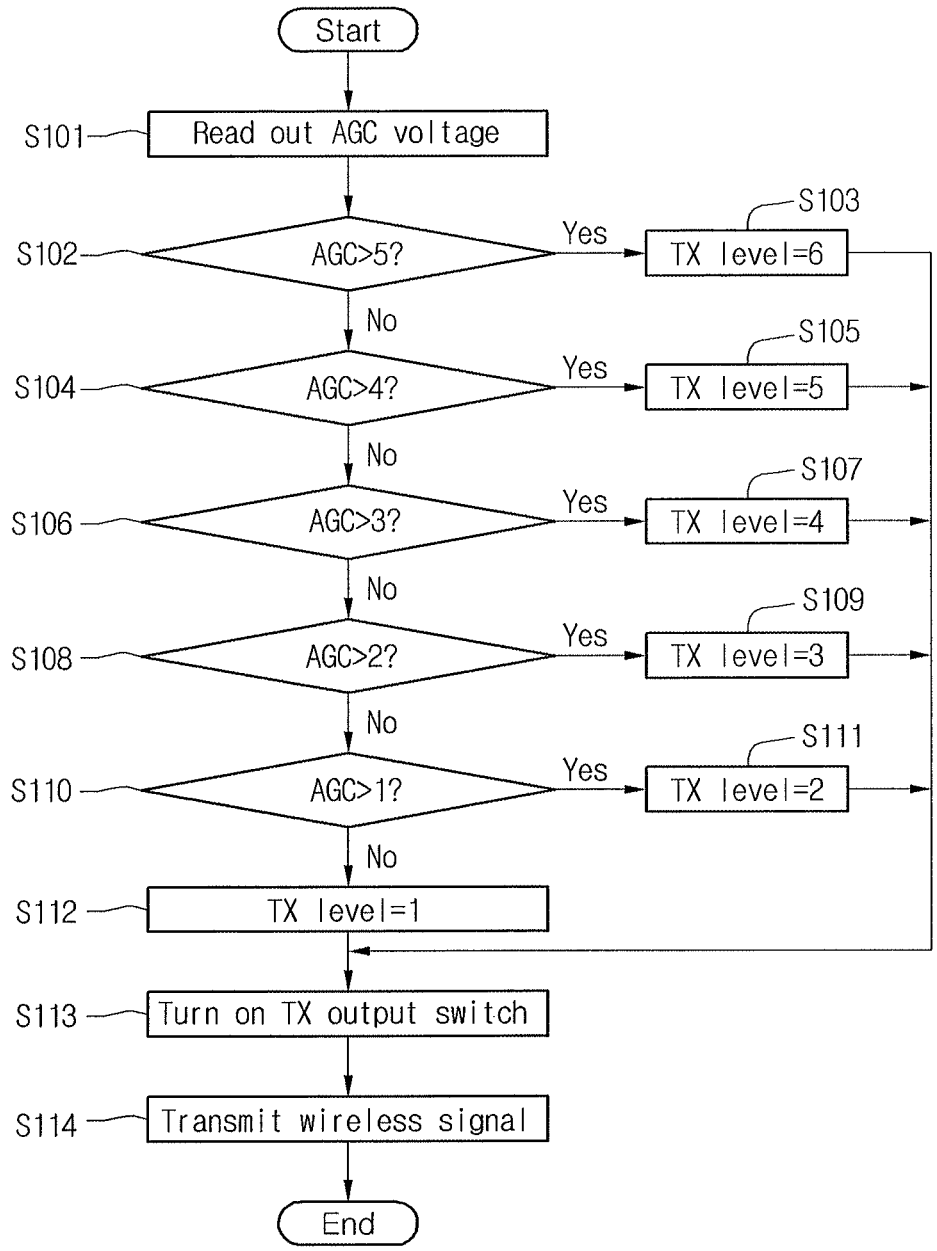
FIG. 3 is a flowchart illustrating a wireless communication method according to the embodiment.

FIG. 3 is a flowchart illustrating by steps a wireless communication method according to the embodiment.

Referring to FIG. 3, in step S101, the control unit 180 reads out an AGC voltage input through the ADC unit 140 to identify the strength of a reception signal.

In step S102, the control unit 180 determines whether the read AGC voltage is greater than 5.

In step S103, when the AGC voltage is greater than 5 in step S102, the control unit 180 determines that a current communication environment is not good and thus, sets the strength of the transmission signal to 6.

In step S104, when the AGC voltage is not greater than 5 in step S102, the control unit 180 determines whether the AGC voltage is greater than 4.

In step S105, if the AGC voltage is greater than 4 in step S104, the control unit 180 sets the strength of the transmission signal to 5.

To the contrary, in step S106, when the AGC voltage is not greater than 4 in step S104, the control unit 180 determines whether the AGC voltage is greater than 3.

In step S107, if the AGC voltage is greater than 3 in step S106, the control unit 180 sets the strength of the transmission signal to 4.

In step S108, if the AGC voltage is not greater than 3 in step S106, the control unit 180 sets the strength of the transmission signal to 2.

In step S109, if the AGC voltage is greater than 2 in step S108, the control unit 180 sets the strength of the transmission signal to 3.

To the contrary, in step S110, if the AGC voltage is not greater than 2 in step S108, the control unit 180 sets the strength of the transmission signal to 1.

In step S111, if the AGC voltage is greater than 1 in step S110, the control unit 180 sets the strength of the transmission signal to 2.

In step S112, if the AGC voltage is less than 1 in step S110, the control unit 180 sets the strength of the transmission signal to 1.

In step S113, the control unit 180 outputs a transmission output switch-on signal to the switch 110, such that the antenna is connected to the PA 160.

Then, in step S114, the control unit 180 allows the transmission signal to be amplified according to the set strength of the transmission signal and transmits the amplified transmission signal to another apparatus through the antenna.

According to the embodiment, the strength of the transmission signal is identified and varied interactively with the strength of the reception signal in communication environment among apparatuses equipped with wireless communication modules, so that the power consumption due to the amplification of the transmission signal can be reduced and radio interference on other apparatuses can be effectively reduced.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A wireless communication apparatus comprising:
   an antenna for receiving a reception signal transmitted from an outside and for transmitting the transmission signal to the outside;
   a receiving unit for demodulating the reception signal received through the antenna;
   a transmitting unit for generating the transmission signal to be transmitted through the antenna; and
   a control unit for determining a strength of the reception signal received through the antenna in order to set a strength of the transmission signal based on the strength of the reception signal,
   wherein the transmittin unit further includes:
      a power amplifier for amplifying the transmission signal based on the transmitting strength set through the control unit, and
      a digital-to-analog converting unit disposed between the power amplifier and the control unit for converting information about the strength of the transmission signal output through the control unit into an analog signal and transferring the analog signal to the power amplifier.

2. The wireless communication apparatus of claim 1, wherein the control unit determines the strength of the reception signal by using an AGC voltage output through the receiving unit.

3. The wireless communication apparatus of claim 2, further comprising;
   an analog-to-digital converting unit for receiving the AGC voltage output through the receiving unit, converting the received AGC voltage into a digital signal, and transferring the digital signal to the control unit.

4. The wireless communication apparatus of claim 1, wherein the control unit sets the strength of the transmitting unit inversely proportional to the strength of the receiving signal.

5. The wireless communication apparatus of claim 1, further comprising;
   a switch for outputting the reception signal received through the antenna to the receiving unit or for outputting the transmission signal generated through the transmitting unit according to a control signal of the control unit.

6. The wireless communication apparatus of claim 1, wherein the strength of the transmission signal is increased when the strength of the reception signal is decreased, and the strength of the transmission signal is decreased when the strength of the reception signal is increased.

7. A wireless communication method of a wireless communication apparatus including an antenna, a receiving unit, a power amplifier, a digital-to-analog converting unit, a transmitting unit and a control unit, the wireless communication method comprising:
   receiving, by the receiving unit, a reception signal transmitted from an outside through the antenna;
   determining, by the control unit, a strength of the reception signal;
   setting, by the control unit, a strength of a transmission signal transmitted to an outside based on the determined strength of the reception signal;
   converting, by the digital-to-analog converting unit, information about the strength of the transmission signal output through the control unit into an analog signal and transferring, by the digital-to-analog converting unit, the analog signal to the power amplifier;
   amplifying, by the power amplifier, the transmission signal based on the analog signal corresponding to the strength of the transmitting signal set through the control unit; and
   transmitting, by the transmitting unit, the transmission signal amplified by the power amplifier through the antenna.

8. The wireless communication method of claim 7, wherein the determining of the strength of the reception signal includes identifying an AGC voltage of the reception signal.

9. The wireless communication method of claim 7, wherein the setting of the strength of the transmission signal includes setting the strength of the transmission signal inversely proportional to the strength of the reception signal.

10. The wireless communication method of claim 7, the strength of the transmission signal is increased when the strength of the reception signal is decreased, and the strength of the transmission signal is decreased when the strength of the reception signal is increased.

* * * * *